US005406179A

United States Patent [19]

Davall et al.

[11] Patent Number: 5,406,179

[45] Date of Patent: Apr. 11, 1995

[54] GARAGE DOOR EDGE ELECTRICAL INTERFACE

[75] Inventors: Ira G. Davall, Monroe; Robert Pariot, New Windsor, both of N.Y.

[73] Assignee: Techstrip, Inc., Pennsauken, N.J.

[21] Appl. No.: 118,447

[22] Filed: Sep. 8, 1993

[51] Int. Cl.[6] .......................... G05D 3/10; E05F 15/10

[52] U.S. Cl. .................................... 318/286; 318/266

[58] Field of Search ............... 318/255, 256, 264, 265, 318/266, 280, 283, 284, 285, 286, 466, 467, 468, 469, 480; 49/25-31

[56] References Cited

U.S. PATENT DOCUMENTS

| | | |
|---|---|---|
| 4,035,702 | 7/1977 | Pettersen et al. . |
| 4,364,003 | 12/1982 | Phipps . |
| 4,463,292 | 7/1984 | Engelmann . |
| 4,583,081 | 4/1986 | Schmitz . |
| 4,701,684 | 10/1987 | Seidel et al. . |
| 4,922,168 | 5/1990 | Waggamon et al. . |
| 4,924,159 | 5/1990 | Olson . |

*Primary Examiner*—Bentsu Ro

*Attorney, Agent, or Firm*—Brumbaugh, Graves, Donohue & Raymond

[57] ABSTRACT

A reversing circuit including an obstruction-sensing device adapted to be used with an electrically powered door or gate, which when connected to a standard motor operator which utilizes an A.C. control voltage and has a two or three button control station (open, close and optional stop) gives the operator capability to reverse power the door or gate should it engage an obstruction when closing. The reversing circuit is connected to the pushbutton wiring of the motor operator and utilizes the control voltage that appears between the stop-open terminal pair when the door is not opening nor at full open, and that appears between the stop-close terminal pair when the door is not closing nor at full close, as a limited power supply for powering the circuit. Full closure of the door or gate deactivates reopening section of the circuit so as to preclude opening of the door from outside by activating the sensing device.

6 Claims, 1 Drawing Sheet

GARAGE DOOR EDGE ELECTRICAL INTERFACE

BACKGROUND OF THE INVENTION

This invention relates to circuitry for controlling an electrically powered door and, more particularly, to a control circuit for converting motor operators not so designed originally to a system which will prevent further powering of the door in its closing direction should there be an obstruction in the path of movement of the closing door. More specifically, the invention relates to a control circuit adapted to accommodate an obstruction sensing device, such as a safety edge, and which when connected to a motor operator not so equipped converts it into one that reverses powering of the door should it engage an obstruction while closing.

Electrical sensing strips have long been used as safety edges for electrically powered doors, movable walls, curtains and the like to provide safe operation. An obstruction, such as a person or an object, in the closure path of the door or wall causes deformation of the strip and closure of an electrical contact which, in turn, causes immediate deenergization or reversal of the drive motor. Thus, injury to a person or damage to an object obstructing closure of the door is prevented.

Motor operators for electrically powered doors equipped with a safety edge require special wiring, typically consisting of a double pole double throw relay whose coil is activated by closure of a contact in the safety edge. One set of normally closed contacts on this relay is connected in series with the closed coil of the reversing controller and the other set of contacts, which are normally open, is connected in parallel with the OPEN button. Activation of this relay by closure of the electrical contact in the safety edge by engagement with an obstruction stops further powering in the closing direction, reverses the direction of door movement and powers the door to the full open position. Relay activation by the safety edge coming in contact with the floor is prevented by a normally closed limit switch connected in series with the relay coil that opens just before the door strikes the floor. This also prevents activation of the door by the sensing device after it has been completely closed; this is important from the security standpoint because sensing devices typically used in safety edges can be actuated from the outside. Single phase motor operators require instant reverse motors, quick reverse motors, or some special circuitry to guarantee that the motor will not continue to run in the closing direction even though the reversing controller has switched contacts. Should this occur, the limit switches in series with the relay coil on the reversing controller would no longer be in the proper circuit and the motor operator would not shut itself off.

While there is widespread use of door operators which incorporate obstruction sensing devices, there is also a large population of motor operators for electrically powered doors and gates which do not have, and were not designed to accommodate, an obstruction-sensing device in an edge of the door or gate. The majority of standard operators for commercial/industrial doors and gates utilize 24 volts A.C. as a control voltage, have normally closed limit switches in the control circuit for providing positional reference, and two or three push buttons (OPEN, CLOSE) or (OPEN, CLOSE and STOP) provide the person-machine interface.

In the interest of safer operation, it would be desirable if such operators, too, were capable of immediately stopping door closure, and reopening or reversing upon engaging an obstruction. However, because the circuitry required to accomplish the reversing function is relatively more complex than, and generally incompatible with, the simple pushbutton control circuitry of standard operators, it is difficult to alter such operators, at a commercially feasible cost, so as to be capable of reversing when the door engages an obstruction.

A primary object of the present invention is to provide a circuit adapted to accommodate an obstruction-sensing device and which when connected to a motor operator not so equipped converts it into one that reverses powering of a door or gate upon engaging an obstruction while closing.

Another object is to provide such a circuit which can easily be connected to the motor operator without having to analyze the control protocol or modify the circuitry of the operator in question.

A more specific object of the invention is provide a reversing circuit which is universally adapted to retrofit any manually operated 24 volt A.C. motor operator for electrically powered commercial/industrial doors and gates.

Another object is to provide a reversing circuit as described in the preceding paragraph which is universal in the additional respect of being adapted to accommodate therein any obstruction sensing device which provides a dry normally open contact.

SUMMARY OF THE INVENTION

Briefly, the reversing circuit according to the invention includes an obstruction-sensing device adapted for ues with a door or gate and which when connected to a standard motor operator for electrically powered doors which utilizes an A.C. control voltage, has normally closed limit switches in its control circuit for positional reference, and a two or three button station (open, close and optional stop) which give the operator capability to power the door in the reverse direction should it engage an obstruction while closing. The interface between the reversing circuit and the operator consists of four connections to the pushbutton wiring of the operator, the connection being the same regardless of the wiring or control protocol of the operator. The open-stop terminals and also the close-stop terminals of the pushbutton station are utilized as a limited power supply for powering the circuit and to determine door position. More particularly, the control logic of the circuit is based on the recognition that the only time that the control voltage appears between the STOP-CLOSE terminal pair is when the door is not closing nor at full close; and that the control voltage appears between the STOP-OPEN terminal pair when the door is not opening nor at full open. That is to say, the presence or absence of the control voltage at the STOP-OPEN and STOP-CLOSE terminal pairs is used to determine, remotely, positional information and eliminates the need to add limit switches or relays to the existing control circuit of the standard motor operator. The circuit disconnects itself when the door is fully closed, thereby inactivating the safety edge and precluding opening of the door from the outside by squeezing the safety edge.

BRIEF DESCRIPTION OF THE DRAWINGS

Other objects, features and advantages of the invention will become apparent, and its construction and operation better understood, upon reading the following detailed description and referring to the accompanying drawing, in which.

DESCRIPTION OF THE PREFERRED EMBODIMENT

Figure 1:
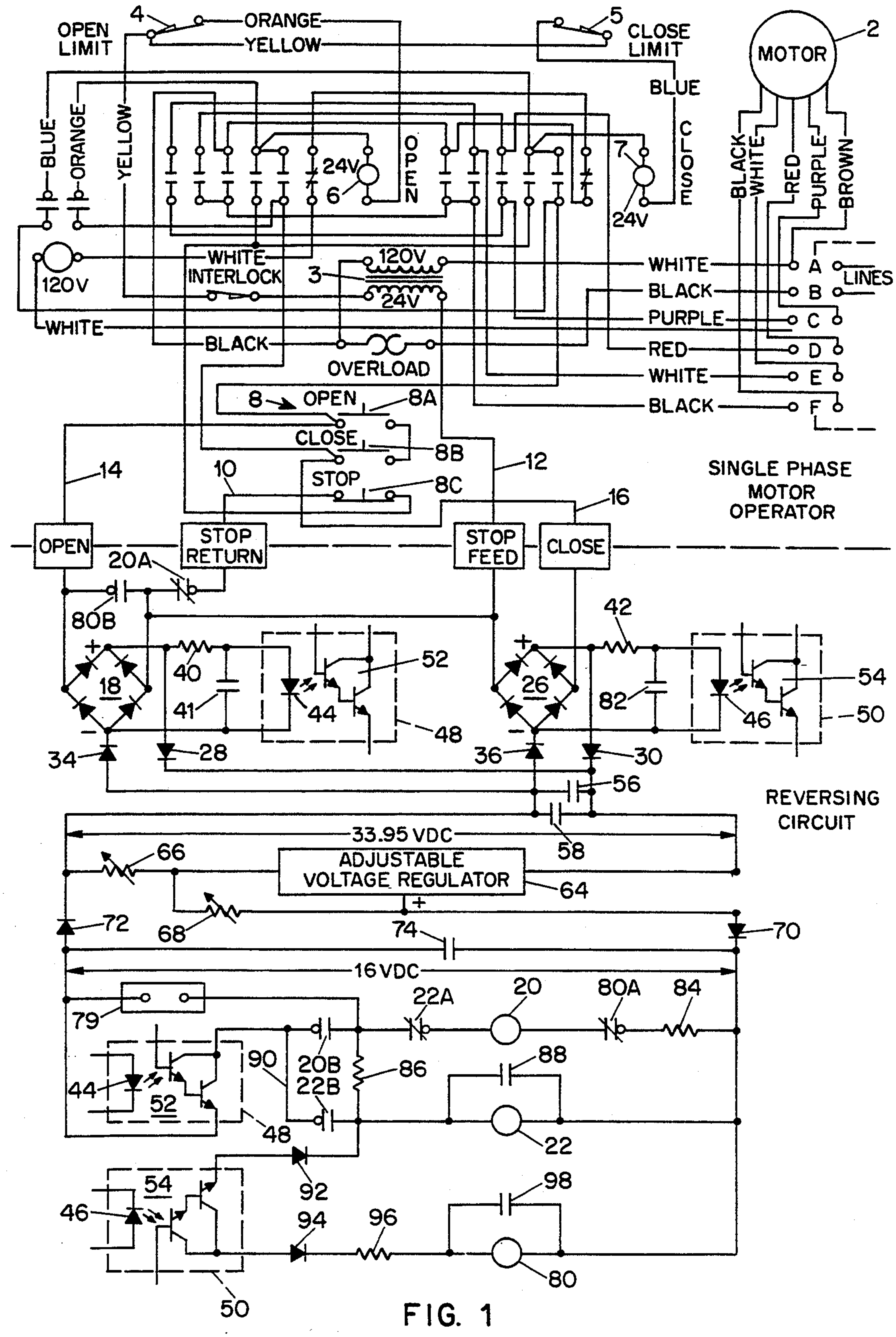
FIG. 1 shows a schematic diagram of a reversing circuit in accordance with the present invention in connection with an existing single phase motor of a garage door opener.

Referring now to the drawing, the reversing circuit according to the invention is shown wired into a standard single phase motor operator typically used to operate electrically powered garage doors. Typically, motor operators of this type include a 120 volts A.C. reversible motor 2, a transformer 3 for deriving a 24 volts A.C. control voltage, open and close limit switches 4 and 5, respectively, open and close relays 6 and 7, respectively, and a pushbutton station 8 comprising manually actuated OPEN, CLOSE and STOP pushbuttons 8A, 8B and 8C, respectively. The reversing circuit of the invention is shown connected at the pushbutton station 8 of the motor operator, the installation consisting of the following simple steps: (a) disconnecting the feed wire from the secondary of transformer 3, which is normally connected to the STOP pushbutton 8C, and connecting it instead to a "STOP FEED" conductor 12 of the reversing circuit; (b) connecting a conductor 12 of the reversing circuit labeled "STOP RETURN" to the terminal of STOP pushbutton 8C from which the feed wire was disconnected in step (a); connecting a conductor 14 of the reversing circuit labeled OPEN to the return wire of the OPEN pushbutton 8A; and (c) connecting a conductor 16 of the reversing circuit labeled "CLOSE" to the return wire of the CLOSE pushbutton 8B. These four simple connections complete the interface between the reversing circuit and the motor operator and are universally applicable regardless of the particular control protocol utilized in a given motor operator.

Turning now to the circuit details of the reversing circuit, conductor 14 is connected to one input terminal of a full-wave bridge rectifier 18, and conductor 10 is connected to the other input terminal via a normally closed contactor 20A of a relay 20. A normally open contact 80B of a relay 80 is connected across the input terminals of rectifier 18. Conductor 12 is connected to the input terminal of bridge rectifier 18 to which conductor 10 is normally connected through contact 20A of relay 20, and also to one input terminal of a second full-wave bridge rectifier 26; conductor 16, labeled "CLOSE" is connected from the return wire of the CLOSE pushbutton to the other input terminal of bridge rectifier 26.

The negative output terminals of bridge rectifiers 18 and 26 are connected via respective isolating diodes 34 and 36 to a common conductor 38, and their positive output terminals are connected via respective isolating diodes 28 and 30 to a common conductor 32. The positive output terminals are additionally connected through respective load resistors 40 and 42, each serially connected with respective light-emitting diodes 44 and 46 of opto-isolators 48 and 50, respectively, the cathodes of which are connected to the negative terminal of its respective bridge rectifier. Conduction of the light-emitting diodes turns on the Darlington pair 52 and 54, respectively, of opto-isolators 48 and 50. The connections to the common collectors and output emitter of each opto-isolator are shown in the lower left-hand corner of the drawing and will be described presently.

The portion of the circuit described thus far operates as follows. When the door is fully closed and stopped or while closing is the only time that the operator's control voltage does not normally appear between the STOP-CLOSE terminal pair and, similarly, when the door is full open and stopped, or while opening, is the only time that the control voltage does not normally appear between the STOP-OPEN terminal pair. When the control voltage appears thereat, the OPEN-STOP terminals and also the CLOSE-STOP terminals are utilized as a limited power supply for powering the reversing circuit.

More particularly, when the operator's control voltage appears between the STOP-CLOSE terminal pair (i.e., between conductors 12 and 16), full-wave bridge rectifier 26 rectifies the 24 VAC control voltage and delivers an unfiltered 33.95 volts D.C. voltage. Similarly, whenever the control voltage is available between the STOP-OPEN terminal pair, full-wave bridge rectifier 18 rectifies the 24 volts A.C. signal and delivers an unfiltered 33.95 V D.C. voltage. The unfiltered 33.95 V D.C. produced by bridge rectifier 26 performs two functions, which are isolated from each other by isolating diodes 30 and 36, as follows: first, the light-emitting diode 46 of opto-isolator 50 is fed through load resistor 42, with a capacitor 82 acting as a filter capacitor to remove some of the ripple, causing conduction of diode 46 which, in turn, gates on the Darlington pair output of opto-isolator 50 and, provides a ground path to other portions of the circuit (to be described); second, and this function is jointly shared with bridge rectifier 18, it serves as an unfiltered 33.95 V D.C. power supply. In like fashion, unfiltered 33.95 V D.C. delivered by bridge rectifier 18 is applied across conductors 32 and 38 and is also fed through load resistor 40 and the light-emitting diode 44 of opto-isolator 48, causing it to conduct and turn on its Darlington pair output; a capacitor 41 connected in parallel with diode 44 removes some of the ripple from the unfiltered D.C. Again, the two functions are isolated from each other by isolating diodes 28 and 34.

The unfiltered D.C. voltage appearing across conductors 32 and 38, whether produced by rectifier 18 or by rectifier 26, is filtered by a pair of capacitors 56 and 58 connected in parallel between conductors 32 and 38 to reduce ripple and appears across conductors 60 and 62 as a partially filtered 33.95 volts D.C. supply for powering the rest of the reversing circuit, which will now be described.

The partially filtered D.C. voltage is applied to an adjustable three-terminal voltage regulator 64, which in combination with associated setting or adjustment resistors 66 and 68 respectively connected between negative conductor 60 and the adjustment terminal of the regulator and the positive output terminal of the regulator, produces a positive output of 16 volts D.C. Diodes 70 and 72 isolate this section, and all sections of the circuit previously discussed, from the rest of the circuit. A capacitor 74 connected between the negative and positive sides of the 16 V D.C. bus functions as a storage capacitor during periods when neither rectifier 26 nor rectifier 18 can act as a power supply, a condition which occurs with certain single phase operators while either side of its contactor is engaged.

The negative side of the 16 V D.C. bus is connected to the normally open contact of an obstruction-sensing device 79, which would be mounted on the edge of a remotely located door or gate (not shown). The obstruction-sensing device may be any of a wide variety of available sensing strips having a dry normally open contact, for example, the sensing strip disclosed in applicants' assignee's U.S. Pat. No. 5,087,799, in which a pair of electrical conductors are positioned in a sealed plastic tube and supported in a molded foam so that external forces resulting from engagement with an obstruction result in electrical contact between the conductors. Upon closure of the contact, signifying that an obstruction has been sensed, the negative side of the D.C. bus is returned to the positive side via two paths: the first path comprises a normally closed contact 22A of a relay 22, the coil of relay 20, a normally closed contact 80A of a relay 80 and a resistor 84 connected in series in the order named; the second path comprises a resistor 86 connected in series with the parallel-connected combination of the coil of relay 22 and a capacitor 88.

Closure of the normally open contact 20B of relay 20 connects the junction of resistor 86 and the normally closed contact 22A of relay 22 to the collectors of the transistors of Darlington pair 52 of opto-isolator 48, the output emitter of which is connected to the negative side of the 16 volt D.C. bus. The collectors of Darlington pair 52 are also coupled via a conductor 90 and a normally open contact 22B of relay 22 to the junction of resistor 86 and the coil of relay 22. This junction is connected via a diode 92 to the output emitter of the Darlington pair 54 of opto-isolator 50, the collectors of which are coupled via a diode 94, a resistor 96 and the coil of relay 80 connected in series in that order to the positive side of the D.C. bus. A capacitor 98 is connected in parallel with the coil of relay 80.

The return signal which results from closure of the normally open contact of sensing device 79 first causes relay 20 to engage, and after a brief pause determined by the values of resistor 86 and capacitor 88, approximately one-half second, relay 22 is engaged, causing its normally closed contact 22A to open and thereby drop out relay 20. During the brief period that relay 20 is engaged two things occur: (1) its normally closed contact 20A breaks the connection between the STOP feed and the STOP return of the interface wiring, stopping the closing motion of the motor operator (effectively this is the same as hitting the STOP button 8C of the motor operator); and (2) its normally open contactor 20B is closed and provides an alternative path for seating relay 22 through the Darlington pair output of opto-isolator 48, making it unnecessary that the obstruction-sensing device 79 maintain its contact throughout the pause period.

The short pause or delay after stopping the downward or closing motion before making the open or upward circuit is essential to accommodating the circuit to the many single phase motor operators in service which have no provision for quick reversing. Such operators will false phase if a quick reverse is attempted, meaning that the close side of the operator's reversing contactor would drop out and the open side would make, but the motor would continue to run in the close or downward direction. This occurs because the direction of rotation of the motor cannot be changed until the start winding is available, which usually does not occur until the speed is reduced to approximately 70% of full speed. The end effect is that the main windings have reversed electrically but the mechanical rotation continues as before, that is, electrically out of sync as compared to actual door movement. As a consequence, the motor operator cannot shut itself off with its normal limit system, not to mention the fact that it would not reverse upon sensing an obstruction, and likely would lead to some level of damage to the door or gate, and possibly to the object sensed as an obstruction, which is exactly what the circuit is intended to protect against.

Once relay 22 is energized, following the aforementioned pause, it holds itself made through its now closed normally open contact 22B and, to repeat, its now open normally closed contact 22A drops out relay 20. As the current through the coil of relay 22 builds up through the timing circuit consisting of resistor 86 and capacitor 88, the current through the coil of relay 80 is also building up through the timing circuit consisting of resistor 96 and capacitor 98. The resistance value of resistor 96 is approximately twice that of resistor 86 so that it takes twice as long to energize relay 80 as it takes to energize relay 22; thus, in the final analysis, relay 22 provides the feed to relay 80 through opto-isolator 50. Therefore, energization of relay 80 depends upon opto-isolator 50 being gated on which, it will be recalled from earlier discussion, occurs when the door or gate is not closing or is not fully closed; this coupled with the fact that the control voltage does not appear between the STOP feed and CLOSE return at full close provides an "invisible" or built in cutout to deactivate the function of the reversing circuit when the door is closed. Energization of relay 80 does two things: (1) through its now closed normally open contact 80B makes the OPEN function of the operator thereby reversing the door to full open; and (2) through its now open normally closed contact 80A locks out the STOP function (relay 20) until relays 22 and 80 drop out, which it will be recalled, are held made for a brief period by capacitors 88 and 98, respectively, as the current through opto-isolator 48 holding them drops out when the door starts to move towards full open.

From the foregoing, it is seen that the present invention provides electrical circuitry for retrofitting motor operators not designed to reverse upon detection of an obstruction to provide this capability and improve their safety. The circuitry is easy to install in that only four wire connections are needed for interfacing with the operator and are made to the same connection points regardless of the wiring diagram or control protocol of the particular operator. The circuit is powered off its connections to the motor operator and is arranged to sense the position of the door and disconnect itself when the door or gate is fully closed, a function normally requiring installation of an extra limit switch in the operator. The obstruction-sensing device associated with the door or gate is deactivated when the door is closed so as to preclude opening of the door from outside by squeezing the safety edge. The circuit will work with any obstruction-sensing device capable of providing a dry normally open contact.

Although the invention has been described in some detail by way of illustration and example for clarity of understanding, it is to be understood that changes and modifications may be made without departing from the spirit of the invention. For example, although the circuit has been described in the environment of a 60 Hz. single phase 24 volts A.C. motor operator, it is equally applicable to three-phase systems and will also operate at 50 Hz.

We claim:

1. A reversing circuit for converting a motor operator to one having capability to power a powered door in a reversing direction should it engage an obstruction while closing, said motor operator including a source of A.C. control voltage, a plurality of normally closed limit switches, a two or three button station having OPEN, CLOSE and optional STOP buttons wired to a control circuit said reversing circuit comprising:

first, second, third and fourth terminals adapted to be connected to OPEN, STOP and CLOSE terminals of the three button station and to a terminal of said source of A.C. control voltage, respectively, wherein the terminal of the source A.C. control voltage was originally intended for connection to the terminal of the STOP button;

rectifier means coupled to said first, third and fourth terminals for deriving from said source of A.C. control voltage a limited D.C. voltage supply for powering said reversing circuit;

an obstruction-sensing device adapted to be operatively associated with the powered door and having a normally open contact adapted to be closed when an obstruction is sensed in the closing path of the powered door; and logic circuit means connected to the normally open contact of said obstruction-sensing device and operative to stop and reversely power the powered door upon closure of the normally open contact of said obstruction-sensing device.

2. A reversing circuit accordingly to claim 1, wherein said logic circuit means includes timing circuit means for introducing a predetermined time delay between stopping and reverse powering the powered door.

3. A reversing circuit according to claim 2 wherein said predetermined time delay is approximately one-half second.

4. A reversing circuit according to claim 1, wherein said rectifier means comprises:

first rectifier means coupled to said first and fourth terminals for normally deriving a D.C. voltage from said source of A.C. control voltage whenever the powered door is not opening nor at full open; and second rectifier means coupled to said third and fourth terminals for normally deriving a D.C. voltage from said source of A.C. control voltage whenever the powered door is not closing nor at full close.

5. A reversing circuit according to claim 4, wherein said first and second rectifier means each include a full-wave bridge rectifier.

6. A reversing circuit according to claim 1, wherein said logic circuit means includes:

first relay means having a first contact which closes when an obstruction is sensed, for removing power and stopping downward motion of the door, and second relay means having a contact, which after a brief pause following closure of said first contact of said first relay means, closes and drops out said first contact of said first relay means and causes reopening of the powered door if it is not fully closed.

* * * * *